United States Patent
Okubo et al.

(10) Patent No.: US 6,522,684 B2
(45) Date of Patent: Feb. 18, 2003

(54) DELAY LOCK LOOP, RECEIVER, AND SPECTRUM SPREADING COMMUNICATION SYSTEM

(75) Inventors: Seiji Okubo, Tokyo (JP); Toshiharu Kojima, Tokyo (JP); Akinori Fujimura, Tokyo (JP)

(73) Assignee: Mitsubishi Denki Kabushiki Kaisha, Tokyo (*) Notice: Subject to any disclaimer, the term of this patent is extended or adjusted under 35 U.S.C. 154(b) by 175 days.

(21) Appl. No.: 09/778,938

(22) Filed: Feb. 8, 2001

(65) Prior Publication Data

US 2001/0033602 A1 Oct. 25, 2001

(30) Foreign Application Priority Data

Apr. 10, 2000 (JP) .......................................... 2000-108614

(51) Int. Cl.[7] ............................................... H04B 1/707
(52) U.S. Cl. ......................... 375/147; 375/141; 375/376
(58) Field of Search ................................. 375/130, 140, 375/141, 146, 147, 376

(56) References Cited

U.S. PATENT DOCUMENTS 5,280,538 A    1/1994   Kataoka et al.

FOREIGN PATENT DOCUMENTS

| GB | 234002 A | * | 2/2000 |
|----|----------|---|--------|
| JP | A4347944 |   | 12/1992 |
| JP | A6197096 |   | 7/1994 |

* cited by examiner

Primary Examiner—Temesghen Ghebretinsae
(74) Attorney, Agent, or Firm—Birch, Stewart, Kolasch & Birch, LLP

(57) ABSTRACT

In a DLL, in-phase correlation signal and orthogonal correlation signal are squared and adder to generate correlation power. Delays are provided so that the peaks of N number of divided correlation power portions to have coincided timing with each other. Composite correlation power is generated from the respective correlation power portions. A composite error signal of a sample clock is generated by subtracting the composite correlation power from the composite correlation power that has been delayed. A data clock is generated by frequency-dividing the sample clock based upon an acquisition pulse. A sample clock is finally generated based upon the composite error signal that has been latched and noise-removed therefrom in synchronized timing with the data clock that has been delayed.

14 Claims, 12 Drawing Sheets

DELAY LOCK LOOP, RECEIVER, AND SPECTRUM SPREADING COMMUNICATION SYSTEM

FIELD OF THE INVENTION

The present invention in general relates to a delay lock loop (hereinafter, referred to as DLL) used for a direct spectrum spreading communication system. More particularly, this invention relates to a DLL which carries out a code synchronization tracking process between a spread code sequence which has been multiplied with a signal received from a transmitter and a spread code sequence used in a correlator of a receiver. This invention also relates to a receiver and a spectrum spreading communication system that uses such a DLL.

BACKGROUND OF THE INVENTION

A conventional DLL will be explained here. In recent years, in the field of mobile communication systems and satellite communication systems, research efforts have been focused on "a code-division multiple-connection communication system using a spectrum spreading system" as one of the transfer systems for images, voice, data, etc. Moreover, in the direct spreading system used in the following conventional technique, an information signal is directly multiplied by a spread code sequence having a band much wider than that of the information signal so that communications are carried out by using the spread information signal.

The conventional spectrum spreading communication system is disclosed, for example, in Japanese Patent Application Laid-Open No. HEI 6-197096. This application discloses Mobile Communication System (hereinafter, referred to as an offset multiplex SS system). In this offset multiplex SS system, parallel data is subjected to a spectrum spreading process by using the same spread code, a time offsetting process and a multiplexing process, and data communication is then carried out.

FIG. 10 shows a construction of a conventional DLL described in Japanese Patent Application Laid-Open No. 4-347944 that makes uses of the direct spreading system. Here, the DLL is a circuit used for tracking a code synchronization that is established between the transmitter side and the receiver side in the initial acquisition circuit. Moreover, in this description, the code synchronizing state refers to a state in which the spread code by which a receiving signal is multiplied and a spread code used in the correlator have the same phase at the time of data demodulation.

In FIG. 10, legends 111 and 112 denote square calculation sections, legend 113 denotes an adder, legend 114 denotes a delay section for adding a delay of time $\delta$ ($0 < \delta \leq 2T_c$) to an inputted signal, 115 is a subtraction section, 116 is a latch section, 117 is a loop filter, 118 is a voltage control generator (hereinafter, referred to as VCC) which changes a timing phase of a clock having a frequency band that is M times the chip rate $R_c$ by using an error signal that has been filtered so as to generate a sample clock, 119 is a data clock generation section, and 120 is a delay section for adding a delay of time $\delta/2$ to the inputted signal.

Operation of the conventional DLL will be explained here. A case is assumed in which the number of multiplexing N is equal to 1 and the delay coefficient $\tau_1$ is equal to 0. In the conventional DLL, first, the square calculation sections 111 and 112 respectively output values obtained by squaring an in-phase correlation signal and an orthogonal correlation signal. The adder 113 adds the in-phase correlation signal thus squared and the orthogonal correlation signal thus squared so that a correlation electric power obtained as a result of the addition is outputted. Moreover, in the subtraction section 115, the correlation power outputted by the adder 113 is subtracted from a correlation power to which the delay is added in the delay section 114 so that an error signal indicating an advance/delay of the timing phase of the sample clock is generated.

In the data clock generation section 119, based upon an acquisition pulse synchronous to the cycle $T_p$ of a spread code sequence by which the multiplex RF signal is multiplied, the sample clock is frequency-divided so that a data clock that has a rising edge in synchronized timing with a peak of the correlation power with a clock cycle of $T_p$ is generated.

In the latch section 116, the above-mentioned error signal is latched at the rising edge of the data clock to which a delay of time $\delta/2$ has been added in the delay section 120. Then, the loop filter 117 carries out a filtering process on the latched error signal so that noise components are eliminated, thereby making it possible to generate an error signal having a high S/N ratio. Finally, in the VCC 118, the timing phase of the clock having a frequency band that is M times that of the chip rate $R_c$ is changed based upon the error signal after having been subjected to the filtering process that is outputted from the loop filter 117 so that a sample clock is generated.

The operation of the conventional DLL will be explained with the help of mathematical equations. For example, assuming that a transmitting carrier angular frequency is $\omega_c$, a digital information signal at time t is D(t), the code length is L, the chip frequency is $T_c$ and a PN signal having the code frequency $LT_c$ is represented by c(t), the receiving RF signal f(t) is represented by the following equation (1):

$$f(t) = D(t)c(t) \cos(\omega_c t) + jD(t)c(t) \sin(\omega_c t) \qquad (1)$$

Here, it is assumed that the frequency of a local carrier generated in a voltage control carrier generator (hereinafter, referred to as VCO) used in this receiver has the same value $\omega_c$ as a transmission carrier angular frequency. Therefore, assuming that the in-phase component (the in-phase component of a complex spectrum spreading signal) that has been subjected to a quadrature detecting process by the receiver is a signal I(t), the signal I(t) is represented by the following equation (2):

$$I(t) = D(t)c(t) \cos(\Delta\theta) \qquad (2)$$

(where $\Delta\theta$ is a carrier phase difference between the transmitter and receiver).

In the same manner, assuming that the orthogonal component (the orthogonal component of the complex spectrum spreading signal) that has been subjected to a quadrature detecting process by the receiver is a signal Q(t), the signal Q(t) is represented by the following equation (3):

$$Q(t) = D(t)c(t) \sin(\Delta\theta) \qquad (3)$$

Moreover, in the receiver, an in-phase correlation signal SI(t) and an orthogonal correlation signal SQ(t) are found from the in-phase component I(t) and the orthogonal component Q(t) that have been subjected to the quadrature detecting process. The in-phase correlation signal SI(t) and the orthogonal correlation signal SQ(t) are respectively represented by the following equations (4) and (5):

$$SQ(t) = \sum_{k=0}^{L-1} Q(t+kT_c)c(kT_c) \quad (5)$$

$$= \sum_{k=0}^{L-1} D(t+kT_c)\sin(\Delta\theta)c(t+kT_c)c(kT_c)$$

Therefore, in the calculation section 113, the correlation power SP(t) is found from the following equation (6):

$$SP(t)=\{SI(t)\}^2+\{SQ(t)\}^2$$

$$SP(t) = \{SI(t)\}^2 + \{SQ(t)\}^2 \quad (6)$$

$$= \left\{\sum_{k=0}^{L-1} D(t+kT_c)c(t+kT_c)c(kT_c)\right\}^2$$

Here, in the case when the initial acquisition has been carried out completely at time α, the digital information signal D (α+$kT_c$) has no transition point in data during the correlation operation (k=0, 1, 2, ..., L−1) Moreover, it is assumed that the time at which the code synchronization has been achieved completely is indicated by α=0. For this reason, in the correlation operation, D (α+$kT_c$) takes a constant value of "1" or "−1", and the correlation power SP(α) is represented by the following equation (7).

$$SP(\alpha) = \left\{\sum_{k=0}^{L-1} c(\alpha+kT_c)c(kT_c)\right\}^2 \quad (7)$$

$$= \begin{cases} \left\{L - \dfrac{(L+1)|\alpha|}{T_c}\right\}^2 & (|\alpha| \leq T_c) \\ 1 & (|\alpha| > T_c) \end{cases}$$

FIG. 11 is a drawing that shows a correlation power characteristic found from equation (7). As shown in FIG. 11, the correlation power SP (α) has a peak at time α=0.

The error signal of the output of the subtraction section 115 is latched at the rising edge of the data clock to which the delay of time δ/2 is added, it is necessary to calculate the value of the error signal DS(γ) at time γ=α+δ/2. Therefore, the error signal DS(γ) is found by subtracting the correlation power SP(γ) outputted by the adder 115 from the correlation power SP(γ−δ) to which the delay of time δ has been added by the delay section 114 as shown in equation (8).

$$DS(\gamma)=SP(\gamma-\delta)-SP(\gamma)$$

$$DS(\gamma) = SP(\gamma-\delta) - SP(\gamma) \quad (8)$$

$$= SP\left(\alpha - \frac{\delta}{2}\right) - SP\left(\alpha + \frac{\delta}{2}\right)$$

FIG. 12 is a drawing that shows an amplitude characteristic of the error signal DS(γ) in the case of δ=$T_c$. As shown in FIG. 12, the error signal DS(γ) forms an S-letter shape passing through the origin, and it has such a characteristic that at the time of γ>0, DS(γ)>0 is satisfied, and at the time of γ<0, DS(γ)<0 is satisfied.

Therefore, in the VCC 118, the synchronization tracking process of the PN signal is carried out while controlling the voltage in such a manner so as to set the error signal DS(γ) to DS(γ)=0.

However, in the conventional DLL, the above-mentioned error signal is formed by the correlation power corresponding to a data sequence of one channel in a plurality of parallel data sequences that have been multiplexed; consequently, this results in a low S/N ratio in the error signal. For this reason, in order to enhance the precision of the sample clock outputted from the conventional DLL and the data clock generated by frequency-dividing the sample clock, the band of the loop filter (117) needs to be narrowed. In this case, in the conventional DLL, the filtering process takes a long time, and the resulting problem is a reduction in the synchronization tracking characteristic.

On the contrary, when the band of the loop filter is widened, noise components in the error signal are not removed sufficiently, with the result that the precision of the sample clock and the data clock becomes lower, causing a problem of degradation in the bit error rate characteristic of demodulated data in the receiver and the spectrum spreading communication system.

SUMMARY OF THE INVENTION

It is an object of the present invention to provide a DLL which can achieve a superior synchronization tracking characteristic with high precision as compared with conventional DLLs. It is also an object of the present invention to provide a receiver and spectrum spreading communication system which can improve the bit error rate characteristic in the demodulated data by using such a DLL.

According to the present invention, composite error signal is calculated by using the composite correlation power. Therefore, the resulting composite error signal is allowed to have a higher S/N ratio as compared with the conventional error signal. Accordingly, even if an attempt is made to widen the loop filter band as compared with the conventional DLL loop filter, it is possible to make the S/N ratio of the composite error signal subjected to the filtering process higher than the conventional S/N ratio, and also to judge the advance/delay of the phase of the sample clock with higher precision. As a result, tracking characteristic which are superior than the conventional DLL can be obtained with high precision. The resulting effect is that a delay lock loop which can generate a sample clock and a data clock with higher precision is obtained.

Other objects and features of this invention will become apparent from the following description with reference to the accompanying drawings.

DESCRIPTION OF THE PREFERRED EMBODIMENTS

Preferred embodiments of a delay lock loop, a receiver and a spectrum spreading communication system according to the present invention will be described below with reference to the attached drawings. However, the present invention is not intended to be limited by these embodiments.

The DLL of the present embodiment, which is used in a spectrum spreading communication system, more specifically, in an offset multiplexing SS system, makes it possible to achieve a superior synchronization tracking property with high precision in a sample clock and data clock generation process as compared with conventional techniques.

Figure 1:
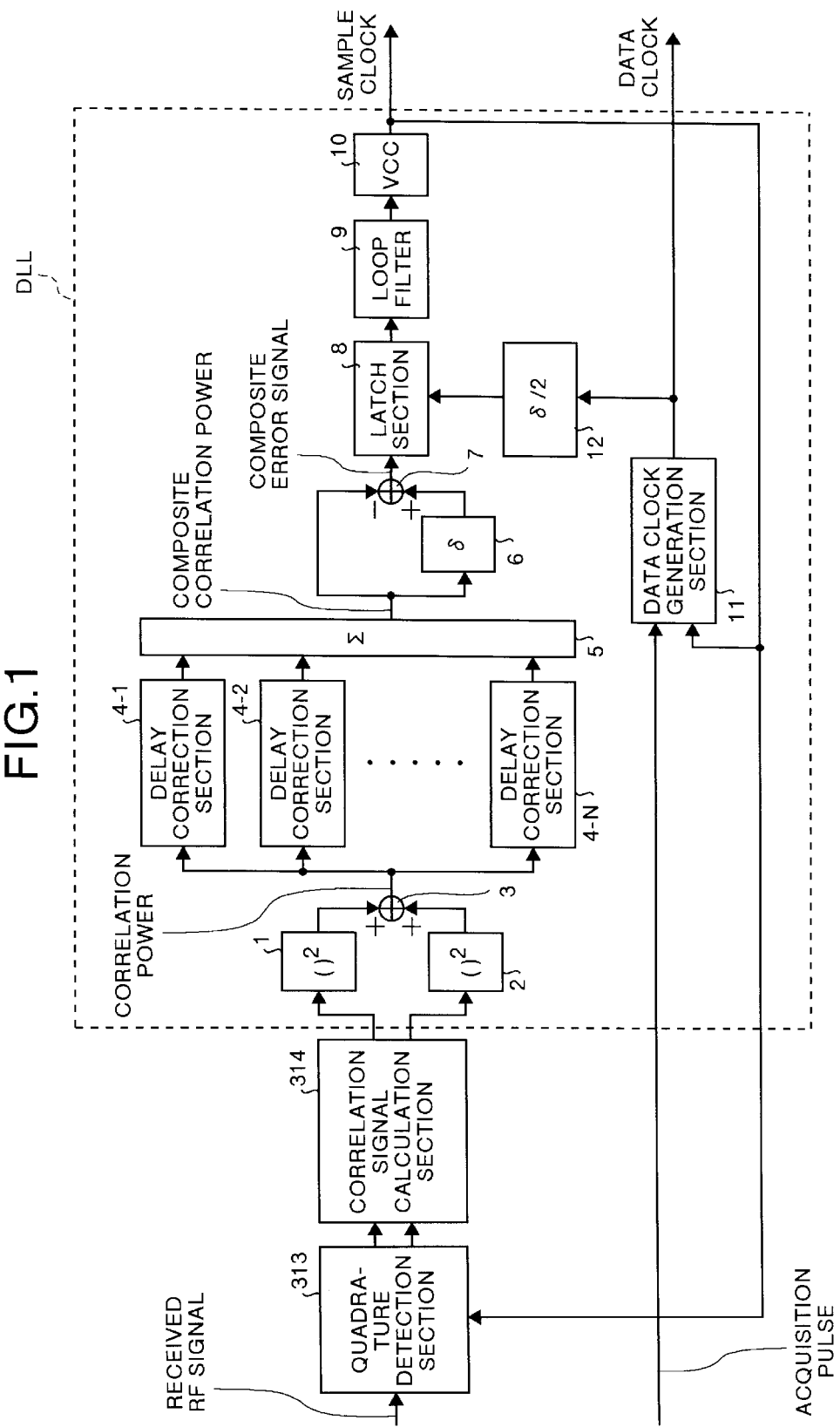
FIG. 1 is a block diagram that shows the construction of a DLL in accordance with the present invention.

FIG. 1 shows a drawing that shows the construction of a DLL in accordance with a first embodiment. In FIG. 1, legends 1 and 2 represent square calculation sections, 3 represents an adder, 4-1 to 4-N represent delay correction sections, 5 represents an adder, 6 represents a delay section for adding a delay of time $\delta(0<\delta\leq 2T_c)$ to the inputted signal, 7 is a subtraction section, 8 is a latch section, 9 is a loop filter, 10 is a VCC, 11 is a data clock generation section, and 12 is a delay section for adding a delay of time $\delta/2$ to the inputted signal.

Figure 10:
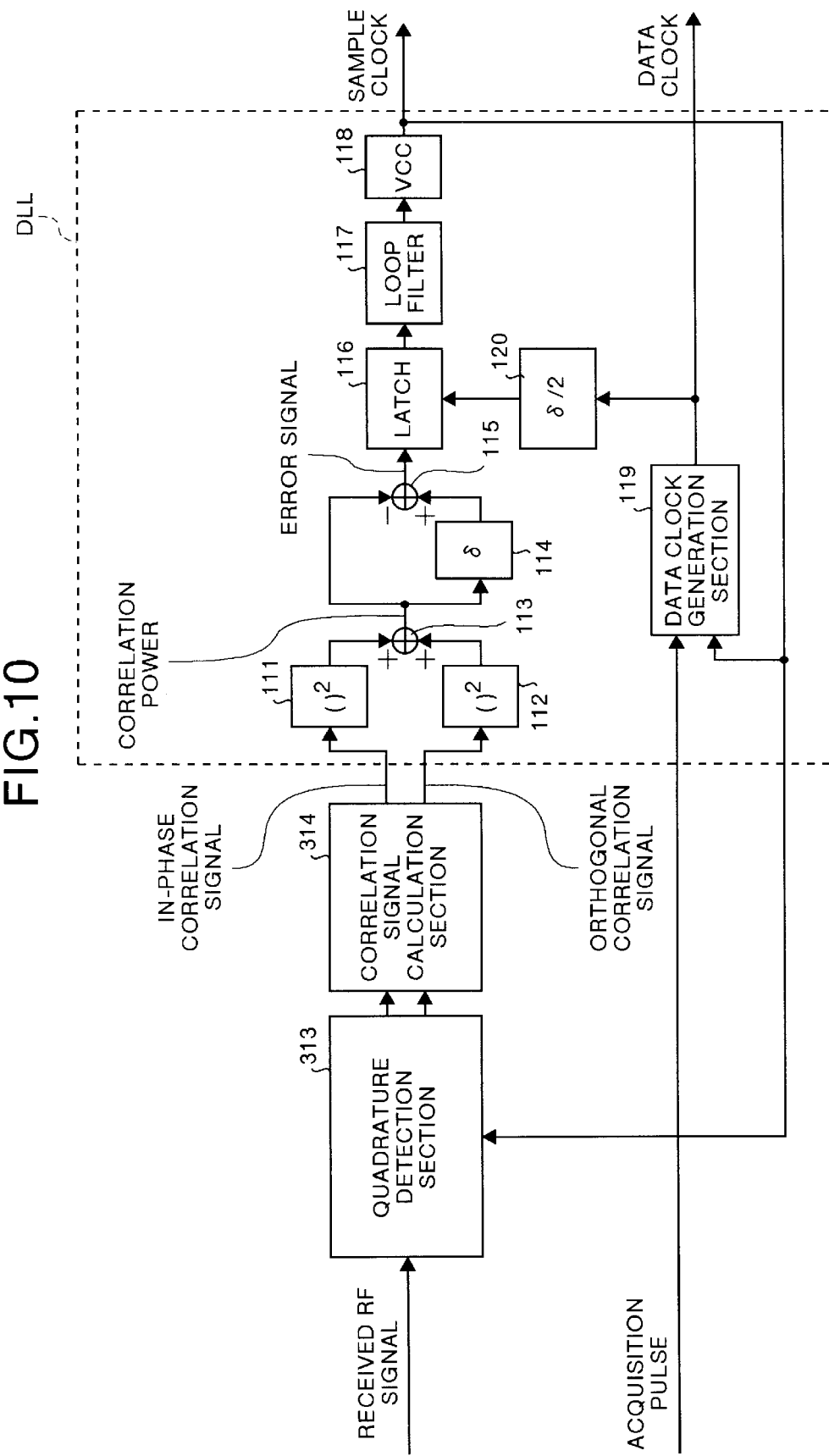
FIG. 10 is a drawing that shows the construction of a conventional DLL.
Figure 11:
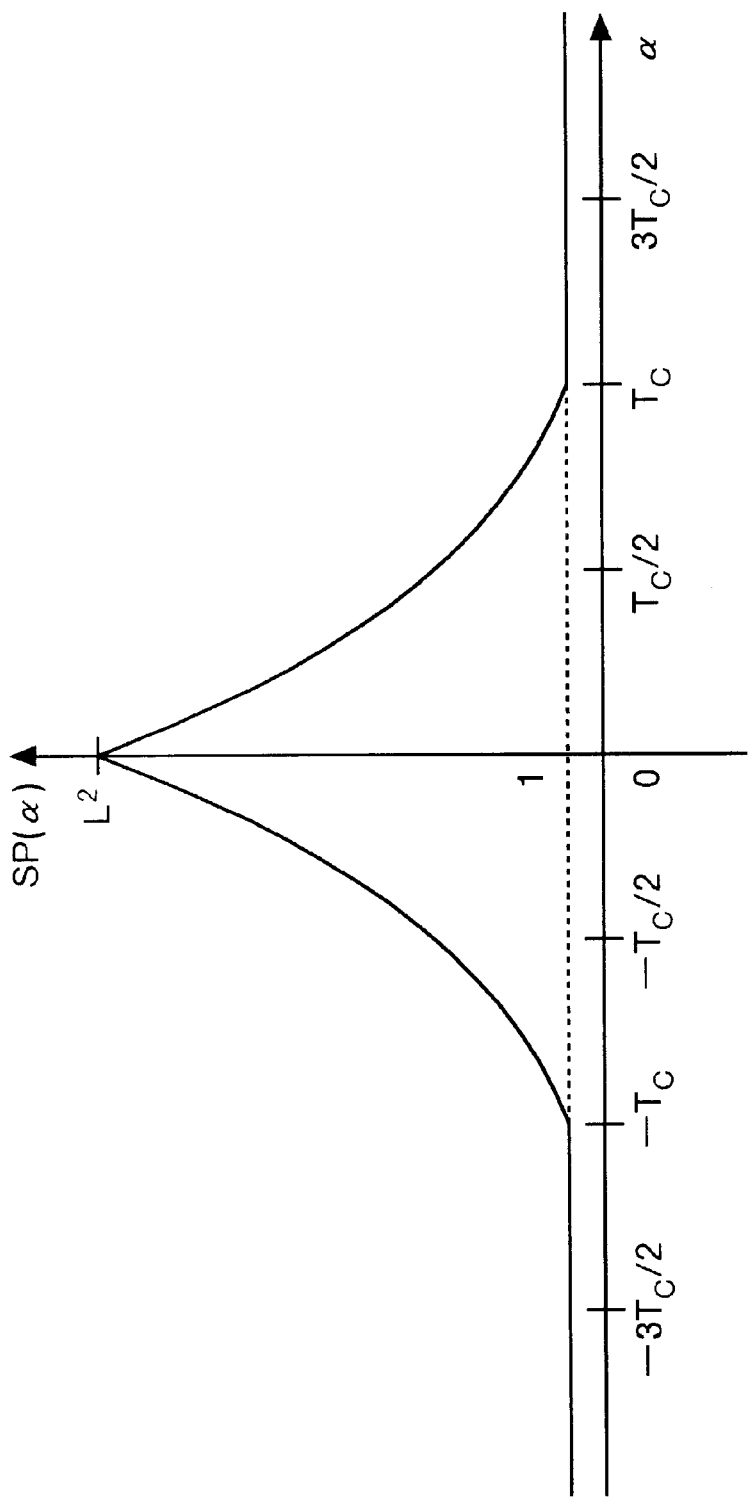
FIG. 11 is a graph that shows a correlation power characteristic in the conventional device.
Figure 12:
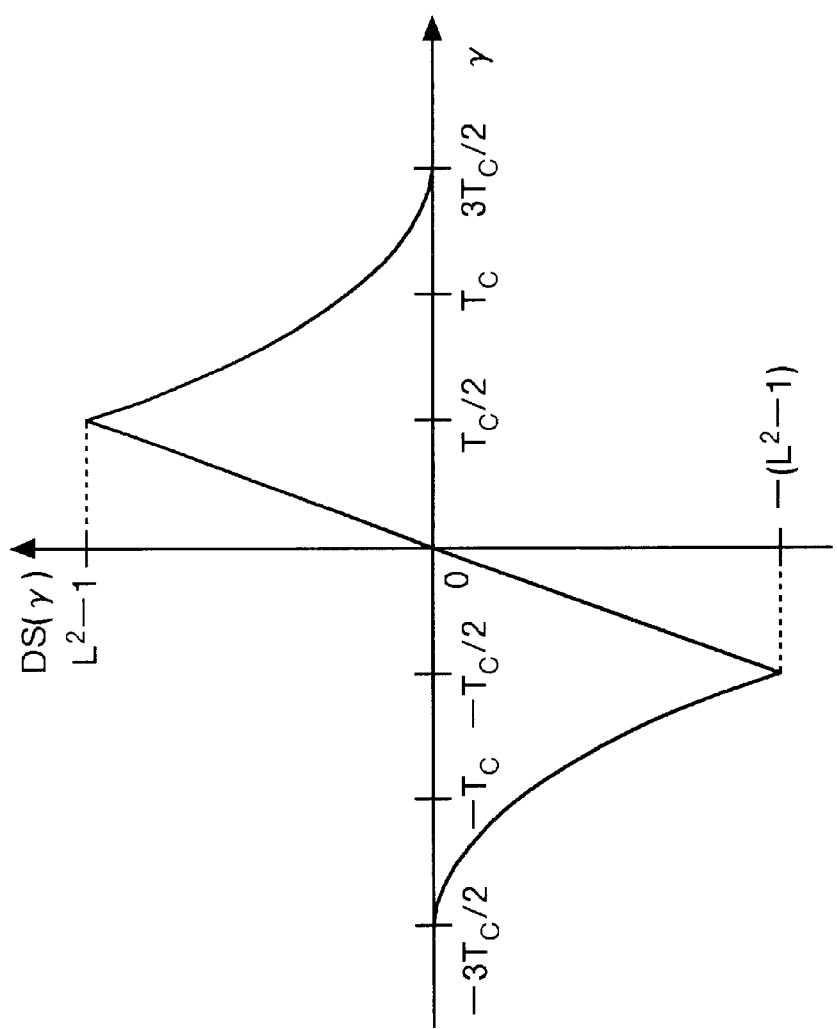
FIG. 12 is a graph that shows an amplitude characteristic of an error signal in the conventional device.

Operation of the DLL of the first embodiment will now be explained. In this DLL, first, the correlation electric power is calculated by using a quadrature detection section, a correlation-signal calculation section, the square calculation section 1 and 2, and the adder 3 shown in the figure, in the same manner as the aforementioned conventional DLL (corresponding to the quadrature detection section, a correlation-signal calculation section, the square calculation sections 111 and 112, and the adder 113 shown in FIG. 10).

The calculated correlation power is divided into N portions, and in the delay correction sections 4-1 to 4-N, delay correction times corresponding to $\{T_P-\tau_1 T_c, T_P-\tau_2 T_c, T_P-\tau_3 T_c, \ldots, T_P-\tau_N T_c\}$ are respectively added to the N number of correlation power portions so that the respective correlation power portions in the parallel data sequences of N channels are allowed to have coincided peak timing. Here, $T_P$ represents a code cycle.

In the adder 5, the N number of correlation power portions to which the delay times have been added in the delay correction sections 4-1 to 4-N are added, and the result of addition is outputted as a composite correlation power value. Moreover, in the subtraction section 7, a composite error signal indicating an advance/delay of the timing phase of the sampling clock is generated by subtracting the composite correlation power value outputted by the adder 5 from the composite correlation power value to which a delay of time $\delta$ has been added in the delay section 6.

In the data clock generation section 11, based upon an acquisition pulse synchronizing to the cycle $T_p$ of a spread code sequence by which a multiplex RF signal is multiplied, the sample clock is frequency-divided so that a data clock which has a rising edge in synchronized timing with the peak of the composite correlation power and also has the cycle $T_p$ is generated.

In the latch section 8, the composite error signal is latched at the rising edge of the data clock to which a delay of time $\delta/2$ has been added in the delay section 12. Then, in the loop filter 9, the latched composite error signal is subjected to a filtering process so that noise components are removed, thereby generating a composite error signal with a high S/N ratio. Lastly, in the VCC 10, based upon the composite error signal that has been subjected to the filtering process, the timing phase of the clock having a frequency band that is M times the chip rate $R_C$ is changed so as to generate a sample clock.

The operation of the DLL of the first embodiment will now be explained with the help of mathematical equations. For example, supposing that the N number of parallel data sequences at time t are $D_i(t)$ ($i=1, 2, \ldots, N$), the code length is L, the chip cycle is $T_c$, the PN signal of the code length L and the chip cycle $T_c$ is $c(t)$, and the delay times given by delay sections (222-1 to 222-N) on the transmitter side which will be described later are $\{\tau_1 T_c, \tau_2 T_c, \tau_3 T_c, \ldots, \tau_N T_c\}$ (where $\{\tau_1, \tau_2, \tau_3, \ldots, \tau_N\}$ are integers satisfying $0\leq\tau_1<\tau_2<\tau_3<\ldots<\tau_N\leq L$), the multiplex spectrum spreading signal MS(t) which is generated by a multiplexing section (223) on the transmitter side which will be described later is represented by the following equation (9):

$$MS(t) = \sum_{i=1}^{N} D_i(t - \tau_i T_c) c(t - \tau_i T_c) \quad (9)$$

Then, based upon the multiplex spectrum spreading signal MS(t) received on the transmitter side, the complex spectrum spreading signal CS(t), outputted from the quadrature detection section shown in the figure, is represented by the following equation (10) in the case when no thermal noise, etc. exist.

$$CS(t)=MS(t)e^{j\Delta\theta} \quad (10)$$

where $\Delta\theta$ represent a carrier phase difference between the transmitter and receiver.

Moreover, based upon the complex spectrum spreading signal CS(t), the in-phase correlation signal SI(t) and the orthogonal correlation signal SQ(t) calculated in the correlation-signal calculation section shown in the figure are represented by the following equations (11) and (12):

$$SQ(t) = \sum_{m=0}^{L-1} MS(t + mT_c) c(mT_c) \sin(\Delta\theta) \quad (12)$$

Therefore, the correlation power SP(t) calculated by using the square calculation sections 1 and 2 and the adder 3 is represented by the following equation (13):

$$SP(t)=\{SI(t)\}^2+\{SQ(t)\}^2$$

$$SP(t) = \{SI(t)\}^2 + \{SQ(t)\}^2 \tag{13}$$

$$= \left\{ \sum_{m=0}^{L-1} \sum_{l=1}^{N} D_l(t - \tau_l T_c + mT_c) c(mT_c) \right\}^2$$

Figure 2:
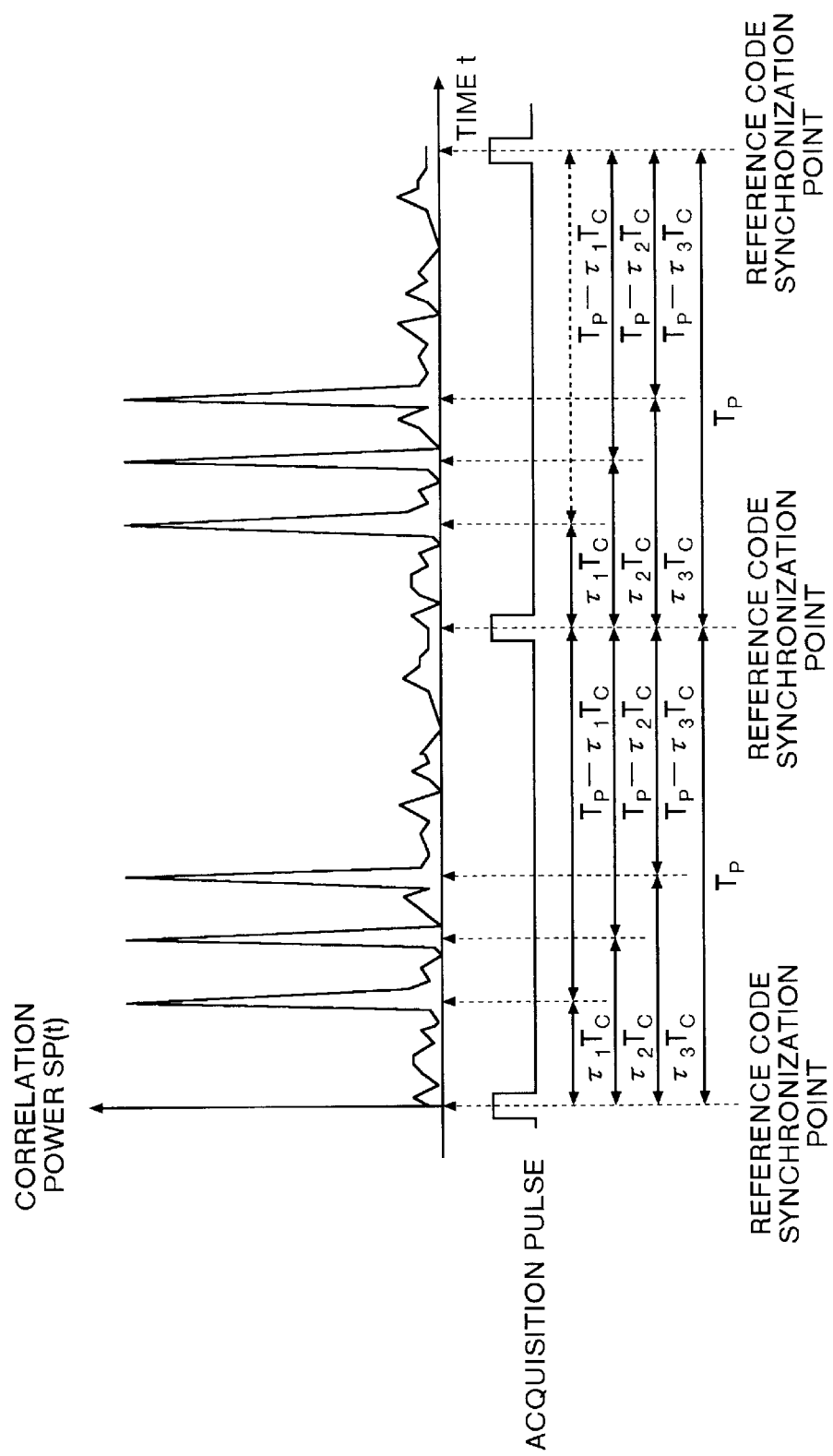
FIG. 2 is a timing chart that shows the relationship between correlation power and acquisition pulses in the case of the number of multiplexing processes N=3.

FIG. 2 is a drawing that shows a timing chart of the correlation power and the acquisition pulse in the case when the number of multiplexing processes N=3 in the above-mentioned offset multiplexing SS system. For example, with respect to the correlation power SP(t), when spread codes by which the multiplexed parallel spectrum spreading signals are multiplied are code-synchronized with each other, it is allowed to have a peak. For this reason, as shown in FIG. 2, the correlation power peaks with respect to the respective parallel spectrum spreading signals appear after the delay times $\{\tau_1 T_c, \tau_2 T_c, \tau_3 T_{3\,c}\}$, given by the respective delay sections in the transmitter, have elapsed from the reference code synchronization point (the code synchronization point in the case when the delay times given by the respective delay sections in the transmitter are "0").

Therefore, in the delay correction sections 4-1 to 4-N, N power portions, prepared by dividing the correlation power SP(t), are corrected so as to respectively have delay times of $-\tau_i T_c$, thereby generating signals $SP_i(t)=SP(t+\tau_i T_c)$ (i=1, 2, ..., N). Here, in an actual operation, in the delay correction sections 4-1 to 4-N, N number of power portions, prepared by dividing the correlation power SP(t), are corrected so as to respectively have delay times of $T_P-\tau_i T_c$, (i=1, 2, ..., N); however, in this case, for simplicity of equations, for example, the delay time correction of $-\tau_i T_c$ (i=1, 2, ..., N) is carried out. In other words, after a lapse of the spread code cycle $T_P$, the composite correlation power $SP_G(t)$, outputted from the adder 5, is represented by the following equation (14):

$$SP_G(t) = \sum_{n=1}^{N} SP_n(t) \tag{14}$$

$$= \sum_{n=1}^{N} \left\{ \sum_{l=1}^{N} \sum_{m=0}^{L-1} D_l(t - (\tau_l - \tau_n)T_c + mT_c) \right.$$

$$\left. c(t - (\tau_l - \tau_n)T_c - mT_c) c(mT_c) \right\}^2$$

As clearly shown by the above-mentioned equation (13), the correlation power SP(t) is allowed to have correlation power peaks corresponding to respective signals $D_W(t)$ at time $t=vT_P+wT_c$ (v=0, ±1, ±2, ..., w=1, 2, ..., N); therefore, an FIR filter constituted by the delay correction sections 4-1 to 4-N and the adder 5 is allowed to function as a matched filter for the correlation power SP(t). Therefore, at time $t=vT_P$, the correlation power peaks corresponding to all the signals Dw(t) are composed so that it is possible to improve the S/N ratio of the composite correlation power $SP_G(t)$.

Moreover, as clearly shown by the above-mentioned equation (14), the composite correlation power $SP_G(t)$ is allowed to have $N^2$ number of correlation power peaks per spread code cycle $T_P$. Among the $N^2$ number of correlation power peaks, N number thereof appear at time $t=vT_P$. However, the rest N(N-1) number of the correlation power peaks appear time $t=vT_P+(\tau_x-\tau_y) T_c$ (x=1, 2, ..., N, y=1, 2, ..., N, x≠y). For this reason, with respect to these N(N-1) number of correlation power peaks, they form side lobes occurring at time $t \neq vT_P$, causing degradation in the syn-chronization tracking characteristic and clock precision of the sample clock and the data clock output from the DLL.

With respect to the composite error signal, since it is latched at the rising edge of the data clock to which the delay of time δ/2 has been added, the value of the composite error signal $DS_G(t')$ at time t'=t+δ/2 needs to be calculated. As indicated by equation (15), the composite error signal $DS_G(t')$ is found by subtracting the composite correlation power $SP_G(t')$ outputted by the adder 5 from the composite correlation power $SP_G(t'-δ)$ to which the delay of time δ has been added in the delay section 6.

$$DS_G(t')=SP_G(t'-δ)-SP_G(t')$$

$$DS_G(t') = SP_G(t' - δ) - SP_G(t') \tag{15}$$

$$= SP_G\left(t - \frac{δ}{2}\right) - SP_G\left(t + \frac{δ}{2}\right)$$

Here, in the same manner as the DLL error signal DS(γ), the composite error signal $DS_G(t')$ has a S-letter shape passing through the origin of coordinates, and it has a characteristic in which at t'>0, $DS_G(t')>0$ is satisfied and at t'<0, $DS_G(t')<0$ is satisfied.

Therefore, in the VCC 10, the synchronization tracking process of the PN signal is carried out by using a voltage control that satisfies $DS_G(t')=0$ in the composite error signal $DS_G(t')$. Here, as indicated by equation (15), the composite error signal $DS_G(t')$ is obtained as a difference value between the composite correlation power $SP_G(t'-δ)$ and the composite correlation power $SP_G(t')$; therefore, as described earlier, in the composite correlation power $SP_G(t)$, N(N-1) number of correlation power peaks occurring at time $t \neq vT_P$ form side lobes, and tend to cause degradation in the composite correlation power $DS_G(t')$ characteristic.

This degradation in the $DS_G(t')$ characteristic occurs when in the range of $-T_c/2<t'<T_c/2$ that is the synchronization tracking range required by the DLL, the composite correlation power $SP_G(t-δ/2)$ or $SP_G(t+δ/2)$ causes side lobes. Moreover, the side lobes of the composite correlation power $SP_G(t)$ occur before and after a time period of $T_c$ with the time $t=vT_P+(\tau_x-\tau_y) T_c$ located in the center (x=1, 2, ..., N, y=1, 2, ..., N, x≠y).

In other words, in the case when, under the definition of the side lobe generation time $\Delta t_{xy}=(\tau_x-\tau_y) T_c$, the side lobe generation time $\Delta t_{xy}$ always satisfies equation (16) with respect to arbitrary x ∈ {1, 2, ..., N} and y ∈ {1, 2, ..., N} where x≠y, it becomes possible to eliminate the occurrence of side lobes in the composite correlation power $SP_G(t-δ/2)$ and $SP_G(t+δ/2)$ in the range of $-T_c/2<t'<T_c/2$, which is the synchronization tracking range required by the DLL.

$$|\Delta t_{xy}| = |(t_x - t_y)T_c| \geq \frac{δ}{2} + \frac{3T_c}{2} \tag{16}$$

Figure 3:
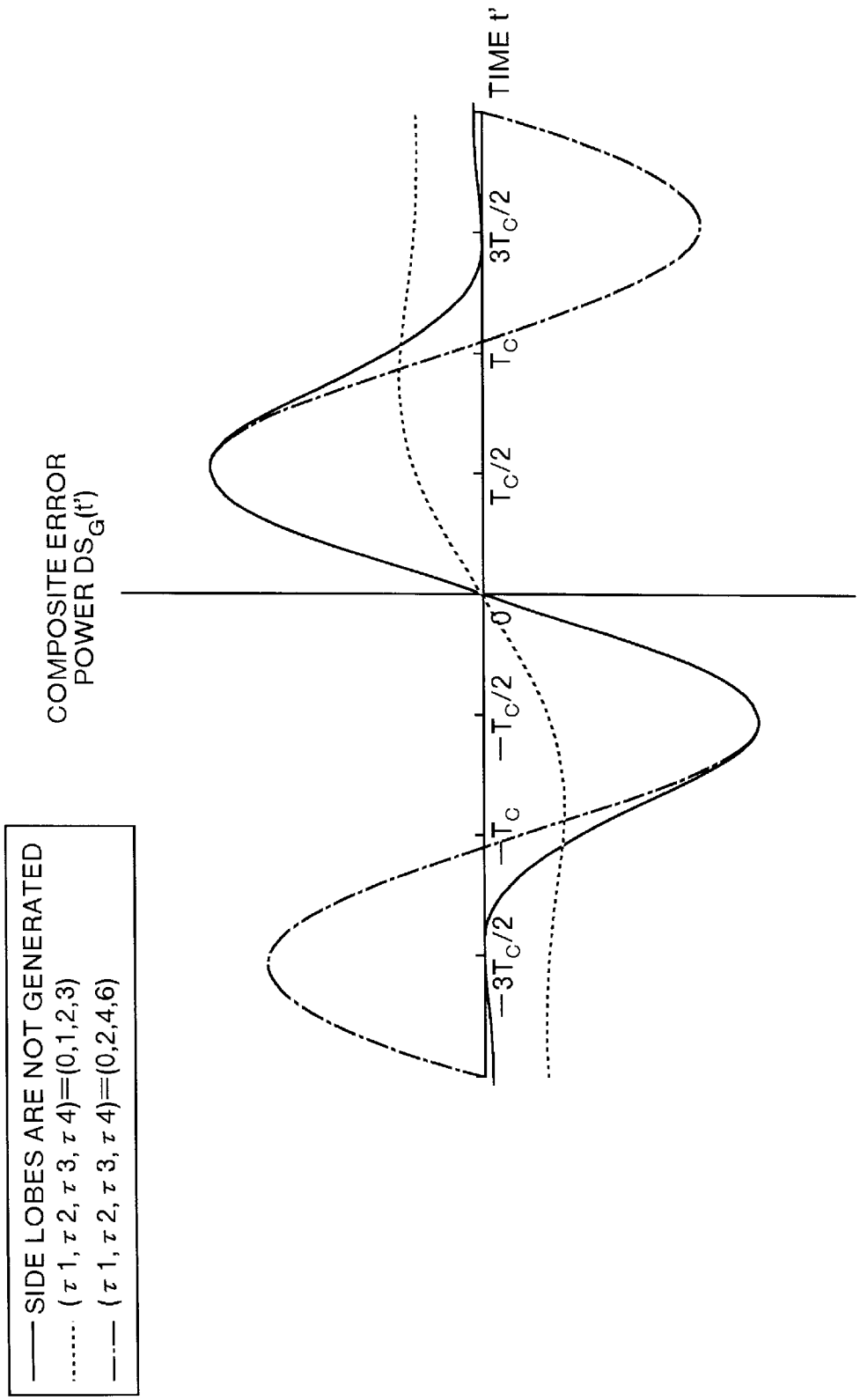
FIG. 3 is a $DP_G(t')$ characteristic of a composite error signal in the case of the number of multiplexing processes N=4 and δ=$T_c$.

FIG. 3 is a drawing that shows a characteristic of the composite error signal $DP_G(t')$ in the case when the number of multiplexing processes N=4 and $δ=T_c$ in the above-mentioned offset multiplexing SS system. As shown in FIG. 3, with respect to $DS_G(t')$ obtained in the case when those delay coefficients $(\tau_1, \tau_2, \tau_3, \tau_4)=(0, 1, 2, 3)$ which always do not satisfy equation (16) are given, it is found that the voltage level is lowered as compared with the composite error power obtained in the case when no side lobes occur within the range of $-T_c/2<t'<T_c/2$ that is a synchronization tracking range required. However, with respect to $DS_G(t')$ obtained in the case when those delay coefficients ($\tau_1, \tau_2, \tau_3, \tau_4$)=(0, 2, 4, 6) which satisfy equation (16) are given, it is found that the voltage level is set to a similar level to that of the composite error power obtained in the case when no side lobes occur within the range of $-T_c/2<t'<T_c/2$ that is the synchronization tracking range required; thus it is possible to reduce a drop in the power level.

In other words, by setting the delay coefficients $\tau_i$ (i=1, 2, ..., N) so as to always satisfy equation (16), within the range of $-T_c/2<t'<T_c/2$ that is the synchronization tracking range required, no degradation due to side lobes occurs; therefore, the DLL in accordance with the present embodiment, it is possible to achieve a superior synchronization tracking characteristic with high precision in the sample clock and data clock generation processes, as compared with the conventional technique.

The delay correction times given by the delay correction sections 4-1 to 4-N are respectively set to $\{T_P-\tau_1 T_c, T_P-\tau_2 T_c, \ldots, T_P-\tau_N T_c\}$ in this first embodiment. However, the present invention is not limited to this. For example, the delay correction times maybe set, for example, to $\{(Y-\tau_1) T_c, (Y-\tau_2) T_c, \ldots, (Y-\tau_N) T_c\}$, that is, the reference code synchronization point may be set at a desired time. Here, Y is an integer satisfying $Y \geq \tau_N$.

In this manner, in the first embodiment, the composite error signal is calculated by using the composite correlation power. Therefore, the resulting composite error signal is allowed to have a higher S/N ratio as compared with the conventional error signal. Accordingly, even if the band of the loop filter is widened as compared with the band of the loop filter of the conventional DLL, it is possible to allow the S/N ratio of the composite error signal that has been subjected to a filtering process to have an S/N ratio higher than the S/N ratio of the conventional device. Moreover, since it is possible to detect the advance/delay of the phase of the sample clock more accurately, it becomes possible to realize a superior synchronization tracking characteristic with higher precision as compared with the conventional DLL. Consequently, a sample clock and a data clock having higher precision can be obtained, as compared with the conventional device.

Moreover, by setting the delay coefficient $\tau_i$ (i=1, 2, ..., N) so as to always satisfy equation (16), it becomes possible to reduce degradation in the composite error signal characteristic caused by side lobes in the composite correlation power, and consequently to realize a better synchronization tracking characteristic with higher precision.

A second embodiment of the present invention will now be explained. In this second embodiment, the DLL of the first embodiment is adopted so as to obtain an offset multiplexing SS system having a superior bit error rate characteristic.

Figure 4:
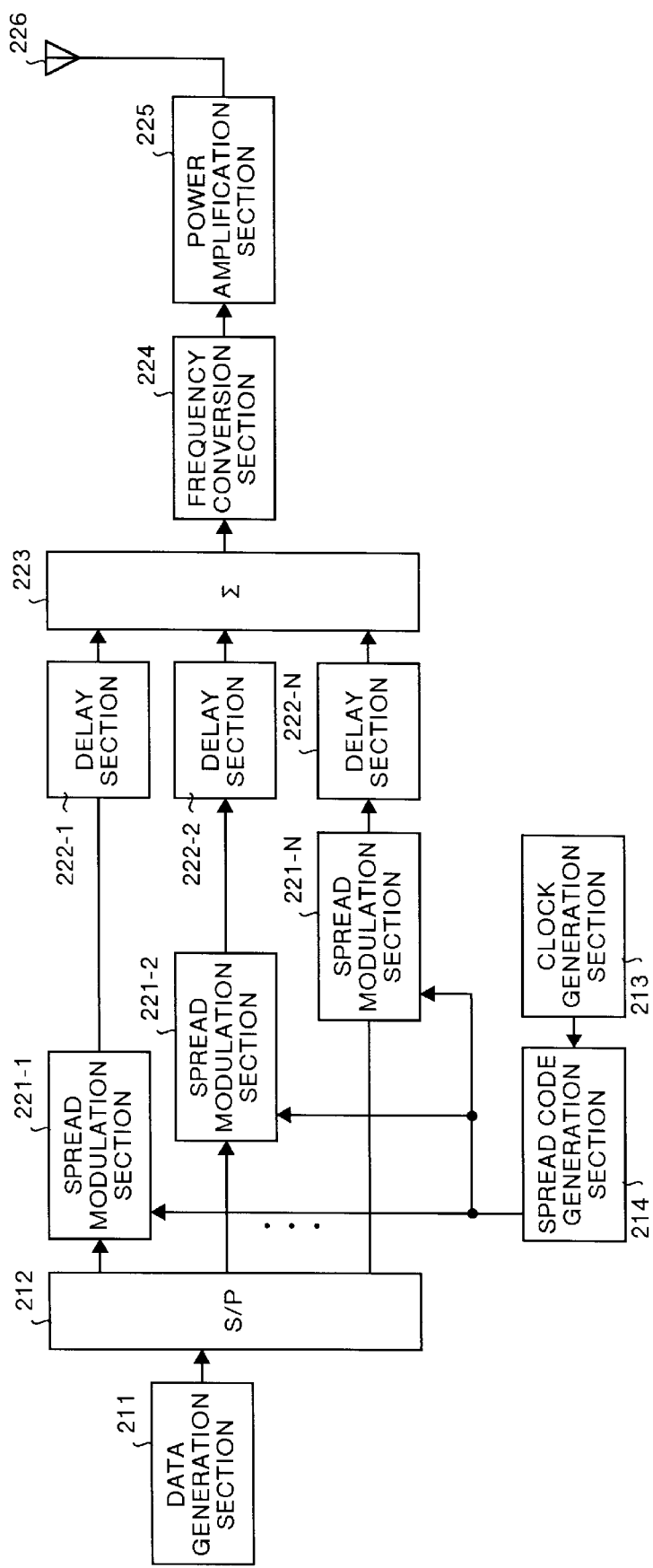
FIG. 4 is a block diagram that shows the construction of a transmitter in a spectrum spreading communication system in the present invention.

FIG. 4 is a drawing that shows the construction of a transmitter in a spectrum spreading communication system in accordance with the second embodiment of the present invention. In other words, this figure shows the construction of a transmitter in an offset multiplexing SS system. In FIG. 4, legend 211 denotes a data generation section, legend 212 denotes a serial/parallel conversion section (hereinafter, referred to as S/P), legend 213 denotes a clock generation section, legend 214 denotes a spread code generation section, legends 221-1 to 221-N denote spreading modulation sections, legends 222-1 to 222-N denote delay sections, legend 223 denotes a multiplexing section, legend 224 denotes a frequency conversion section, legend 225 denotes a power amplification section and legend 226 denotes a transmission antenna.

Operation of the transmitter in the offset multiplexing SS system according to the second embodiment will now be explained. The data generation section 211 first generates a digital information signal having a value of "1" or "−1". Here, the generation rate of the digital information signal is referred to as "bit rate", and the value of the bit rate in digital information signals is denoted as $R_b$.

In the S/P 212, the digital information signal is converted to parallel information signals of N channels. Here, the number of multiplexing processes N is set to a value not more than the spread code length L [bit]. Moreover, in this case, the generation rate of the parallel information signals at the respective channels are referred to as "parallel bit rates", and the value of the parallel bit rate is denoted as $R_p$ ($=R_b/N$). Moreover, the spread code cycle is denoted as $T_p$ ($=1/R_p$).

A spread code sequence used in this transmitter is generated at the spread code generation section 214. This spread code sequence has a value of "1" or "−1" with a code length L [bit], and for example, is provided with a clock frequency band of ($R_p \times L$) that is formed in the clock generation section 213. Here, with respect to the spread code sequence, for example, a known M sequence or Gold code, which only requires a simple circuit to be formed, has small auto-correlation side lobes and also has a small cross-correlation between the respective code sequences, are used. In this case, a clock rate, formed in the clock generation section 213 is referred to as "chip rate $R_c$ ($=R_p \times L$)", and the clock cycle having the chip rate $R_c$ is referred to as "chip cycle $T_c$ ($=1/R_c$)".

In the spreading conversion section 221-1 to 221-N, parallel information signals of N channels are respectively multiplied by spread codes generated by the spread code generation section 214 so that parallel spectrum spreading signals of N channels are generated. Here, the parallel spectrum spreading signals have the frequency band of the chip rate $R_c$.

In the delay sections 222-1 to 222-N, delays corresponding to respectively different periods of time are added to the parallel spectrum spreading signals of the N channels. Here, the delay times added by the delay sections 222-1 to 222-N are represented by $\{\tau_1 T_c, \tau_2 T_c, \tau_3 T_c, \ldots, \tau_N T_c\}$ (where $\{\tau_1, \tau_2, \tau_3, \ldots, \tau_N\}$, which are referred to as "delay coefficients", are integers satisfying $0 \leq \tau_1 < \tau_2 < \tau_3 < \ldots < \tau_N < L$).

In the multiplexing section 223, all the parallel spectrum diffusion signals of the N channels to which the delays have been added are added to generate a multiplex spectrum spreading signal. Further, in the frequency conversion section 224, the multiplex spectrum spreading signal is frequency-converted to a radio frequency (RF) to generate a multiplex RF signal. Thereafter, in the power amplification section 225, the multiplex spectrum spreading signal (multiplex RF signal), frequency-converted to the radio frequency (RF) by the frequency conversion section 224, is amplified in the power, and lastly, the resulting multiplex RF signal thus power-amplified is transmitted through the transmission antenna 226.

Figure 5:
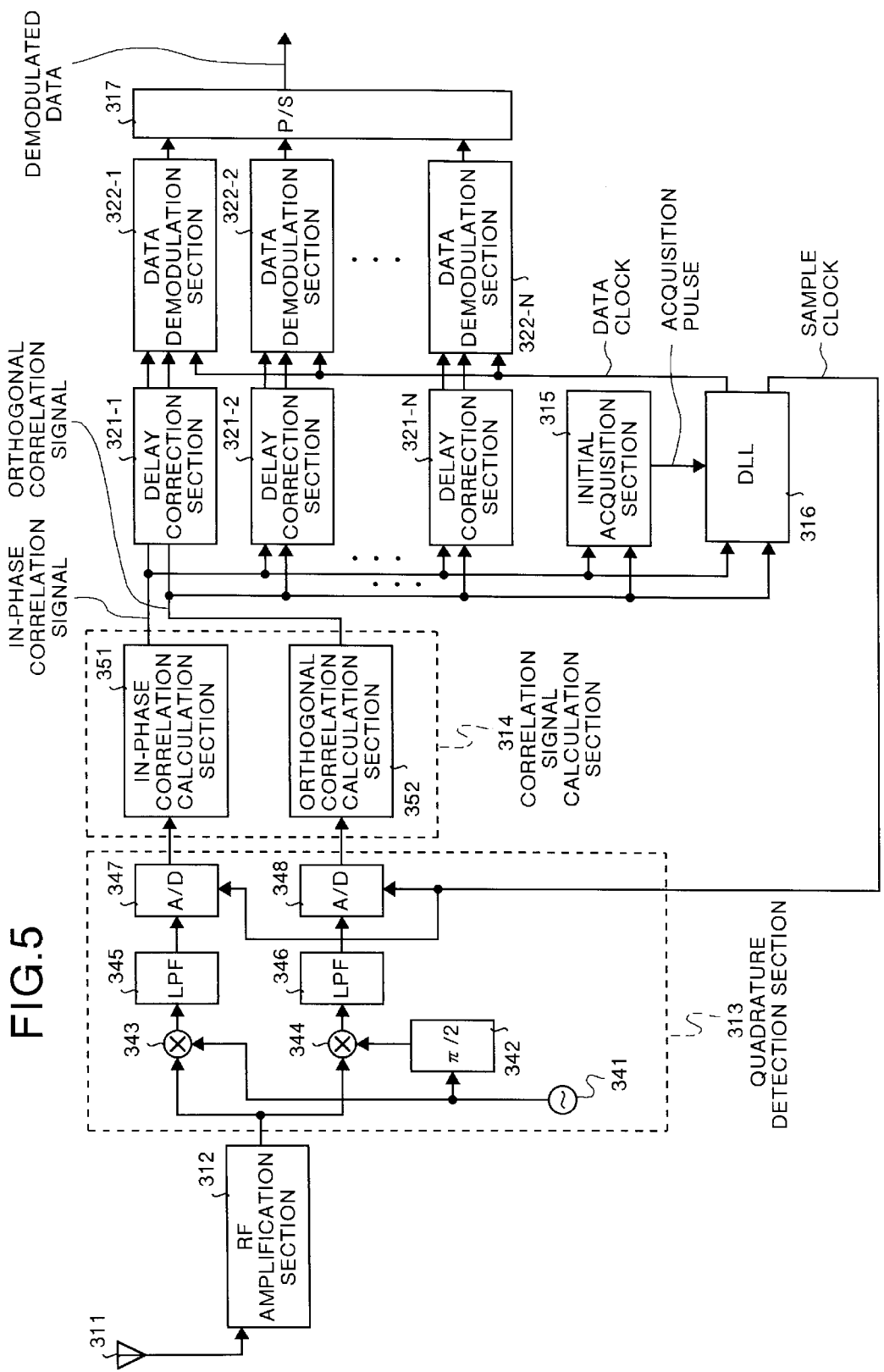
FIG. 5 is a block diagram that shows the construction of a receiver in accordance with a second embodiment in the spectrum spreading communication system in the present invention.

FIG. 5 shows the construction of a receiver in accordance with the second embodiment in the spectrum spreading communication system of the present invention. In other words, this figure shows the construction of the receiver in the offset multiplexing SS system. In FIG. 5, legend 311 denotes a receiving antenna, legend 312 denotes an RF amplification section, legend 313 denotes a quadrature detection section, legend 314 denotes a correlation signal calculation section, legend 315 denotes an initial acquisition section, legend 316 denotes a DLL, legend 317 denotes a parallel/serial conversion section (hereinafter, referred to as P/S), legend 321-1 to 321-N denote delay correction sections and legend 322-1 to 322-N denote data demodulation sections.

Moreover, in the quadrature detection section 313, legend 341 denotes a voltage control carrier generator (hereinafter, referred to a VCO), legend 342 denotes a π/2 phase transfer section, legends 343 and 344 denote multiplication sections, legends 345 and 346 denote low-pass filters, and legends 347 and 348 denote A/D converters (hereinafter, referred as A/D). Furthermore, in the correlation signal calculation section 314, legend 351 denotes an in-phase correlation calculation section, and legend 352 denotes an orthogonal correlation calculation section.

Operation of the receiver in the offset multiplexing SS system according to the second embodiment will now be explained. In the receiver, first, the RF amplification section 312 carries out an RF amplifying process on the multiplex RF signal that has been from the transmitter through the receiving antenna 311.

In the quadrature detection section 313, the multiplication section 343 multiplies the local carrier outputted from the VCO 341 and the multiplex RF signal that has been RF-amplified, the low-pass filter 345 removes higher harmonic components from the signal that has been multiplied, and the A/D 347 samples the signal that has been filtered by using a sample clock having a frequency band that is M times the chip rate $R_c$ so that it generates an in-phase component of the complex spectrum spreading signal satisfying conditions of "a digital value with a frequency band that is M times the chip rate $R_c$".

In the same manner, in the quadrature detection section 313, the multiplication section 344 multiplies a local carrier that has been π/2-phase transferred by the phase transfer section 342 and the multiplex RF signal that has been RF-amplified, the low-pass filter 346 removes higher harmonic components from the signal that has been multiplied, and the A/D 348 samples the signal that has been filtered by using a sample clock having a frequency band that is M times the chip rate $R_c$ so that it generates an orthogonal component of the complex spectrum spreading signal satisfying conditions of "a digital value with a frequency band that is M times the chip rate $R_c$".

In the correlation signal calculation section 314, with respect to the in-phase component and orthogonal component of the complex spectrum spreading signal, the in-phase correlation calculation section 351 and the orthogonal correlation calculation section 352, respectively carry out correlation calculations between the code by which the multiplex RF signal is multiplied and the same spread code sequence as the code for the time corresponding to the spread code cycle $T_P$; thus, they respectively generate an in-phase correlation signal and an orthogonal correlation signal.

Here, the spread code length is set to L; however, since the sampling is carried out at a rate of M times per one chip, the numbers of the in-phase components and the orthogonal components in the complex spectrum spreading signal that are sampled during a time period corresponding to one cycle of the spread code are represented by ML respectively. Therefore, in the in-phase correlation calculation section 351 and the orthogonal correlation calculation section 352, among ML number of the respective components, only the sample signal of the in-phase component or the orthogonal component of the (M×i)-numbered (i=1, 2, ..., L) complex spectrum spreading signal is used so as to generate a correlation value S represented by the following equation (17) for each period of $T_c$/M time.

$$S = \sum_{l=1}^{L} r_{Mi} c_l \qquad (17)$$

In this case, $r_j$ (j=1, 2, ..., ML) represents ML number of sample signals thus inputted, $c_i$ is the same spread code sequence as the code by which the multiplex RF signal having a value of "−1" or "1" is multiplied. Moreover, in the in-phase correlation calculation section 351 and the orthogonal correlation calculation section 352, matched filters, etc. are used.

Figure 6:
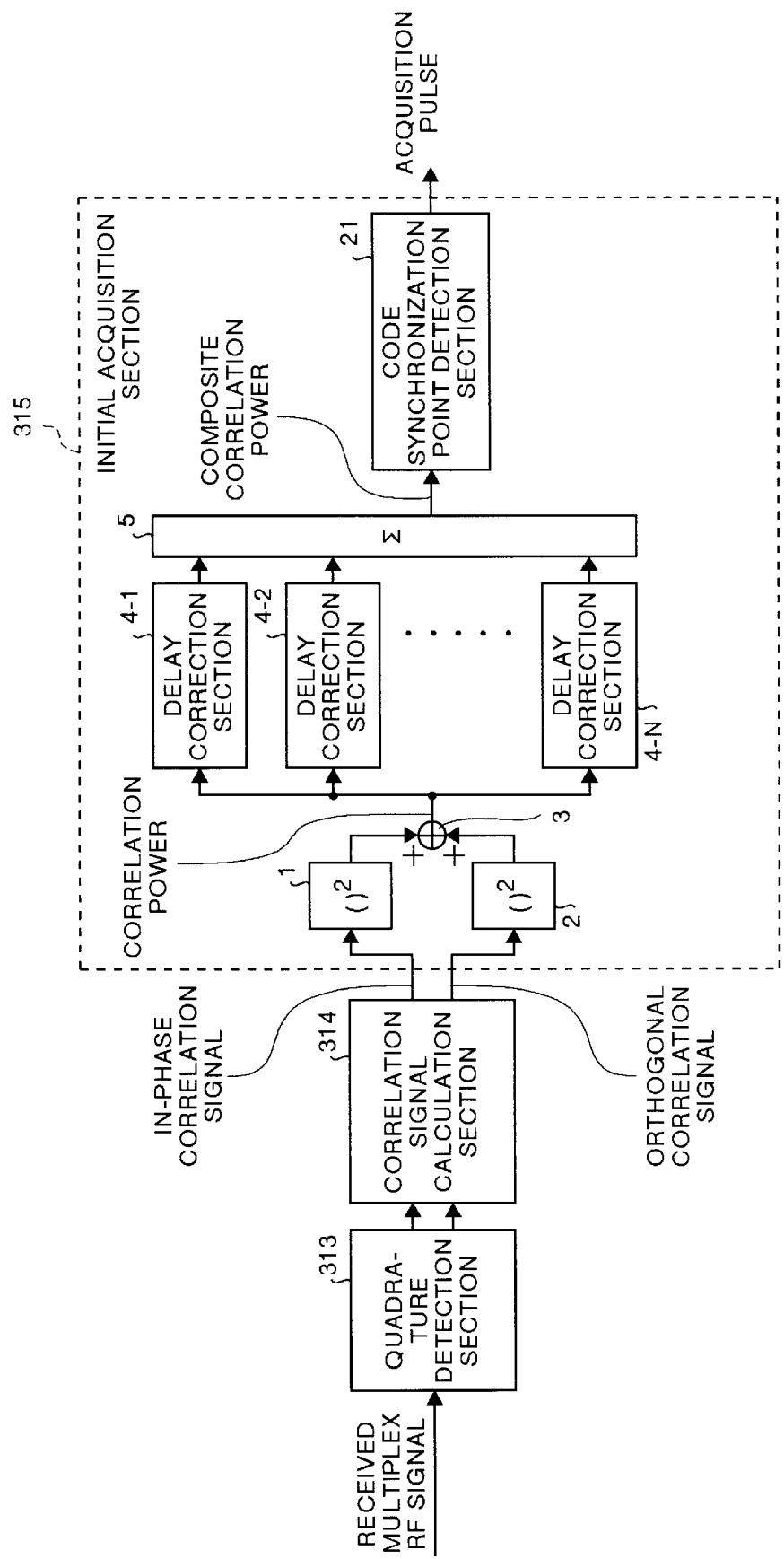
FIG. 6 is a block diagram that shows the construction of an initial acquisition section used in the spectrum spreading communication system in the present invention.

In the initial acquisition section 315, an acquisition pulse, which is synchronous to the cycle $T_p$ of the spread code sequence by which the multiplex RF signal is multiplied, is generated from the orthogonal correlation signal and the in-phase correlation signal. FIG. 6 is a drawing that shows the construction of an initial acquisition section used in the offset multiplexing SS system of the present invention. In FIG. 6, legend 21 denotes a code synchronization point detection section which detects timing at which the composite correlation power has the greatest peak within the spread code cycle $T_P$, and generates an acquisition pulse synchronizing to this timing.

In FIG. 6, as described earlier, the composite correlation power, outputted from the adder 5, generates a peak having the greatest value at the reference code synchronization point for each spread code cycle $T_P$, and has N(N−1) number of correlation power peaks as side lobes appearing at times other than the reference code synchronization point. Here, as described earlier, with respect to the N(N−1) number of correlation power peaks causing side lobes, they are generated at time t=v$T_P$+ ($τ_x$−$τ_y$) $T_c$ (v=0, ±1, ±2, ...; x=1, 2, ..., N; y=1, 2, ..., N; x≠y).

Moreover, since the time of generation of the side lobes only depends on the delay coefficient $τ_i$ (i=1, 2, ..., N), it is possible to prevent the times of generation of the correlation power peaks causing side lobes from overlapping each other by appropriately setting the delay coefficient $τ_i$. In other words, in the present embodiment, since the greatest value of the side lobes of the composite correlation power can be regulated so that it becomes possible to generate the acquisition pulse in the initial acquisition section 314, the sample clock and the data clock with high precision.

In order to prevent the times of generation of the correlation power peaks from overlapping each other, a provision is made so that the following expression (18) is always satisfied with respect to arbitrary a ∈ {1, 2, ..., N}, a'∈ {1, 2, ..., N}, b ∈ {1, 2, ..., N} and b' ∈ {1, 2, ..., N} where a' ≠ a and a'≠b' are satisfied.

$$τ_a − τ_b ≠ τ_{a'} − τ_{b'} \qquad (18)$$

Figure 7:
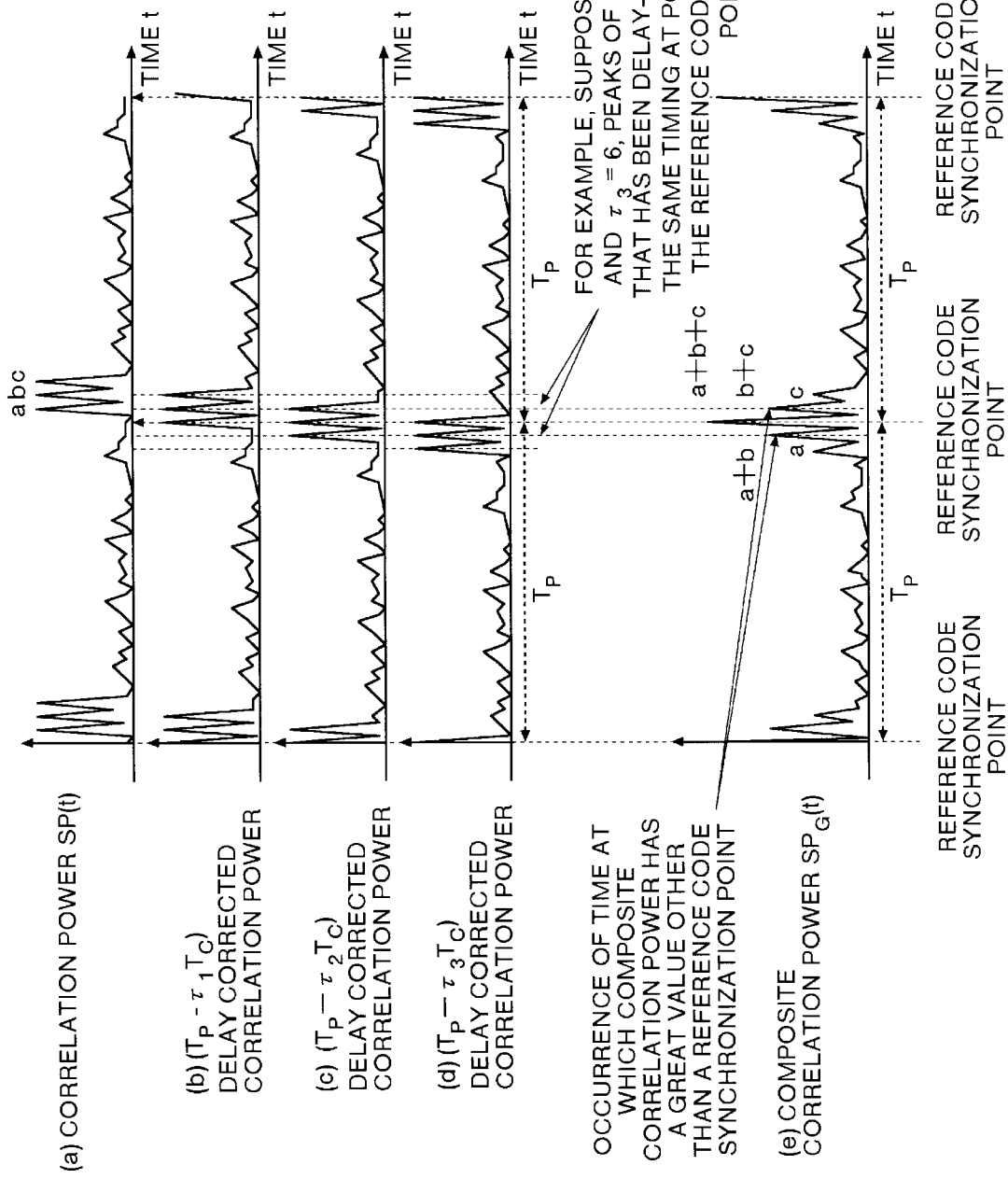
FIG. 7 is a drawing that shows an example of the relationship between correlation electric power and composite correlation power in the case when expression (18) is not satisfied.

FIG. 7 shows a case in which, supposing that $τ_1$=2, $τ_2$=4 and $τ_3$=6 are held so as not to satisfy expression (18), the relationship between the correlation power and the composite correlation power is explained. More specifically, FIG. 7(a) shows a timing chart of the correlation power without applying any delay correction, and FIGS. 7(b) to 7(d) show cases in which the correlation power shown in FIG. 7(a) is respectively delay-corrected by {($T_P$−$τ_1 T_c$), ($T_P$−$τ_2 T_c$), ($T_P$−$τ_3 T_c$)}.

Figure 8:
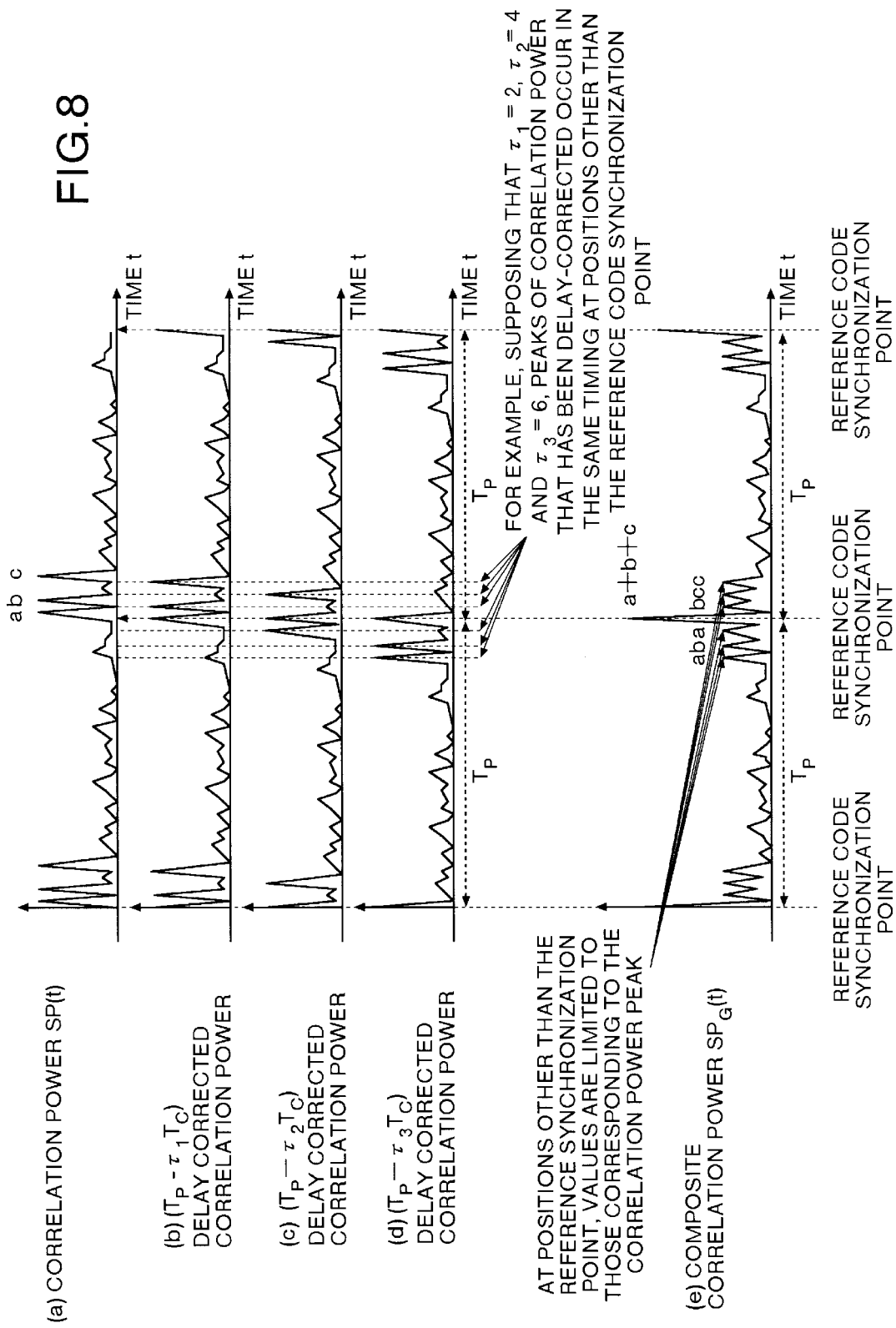
FIG. 8 is a drawing that shows an example of the relationship between the correlation electric power and composite correlation power in the case when expression (18) is always satisfied.

FIG. 8 shows a case in which, supposing that $τ_1$=1, $τ_2$=3 and $τ_3$=7 are held so as to always satisfy expression (18), the relationship between the correlation power and the composite correlation power is explained. More specifically, FIG. 8(a) shows a timing chart of the correlation power without applying any delay correction, and FIGS. 8(b) to 8(d) show cases in which the correlation power shown in FIG. 8(a) is respectively delay-corrected by $\{(T_P-\tau_1 T_c), (T_P-\tau_2 T_c), (T_P-\tau_3 T_c)\}$.

In FIG. 7, since the correlation power peaks that have been delay-corrected occur in the same synchronized timing at positions other than the reference code synchronization point, side lobes whose greatest value corresponding to not less than two peaks of the correlation power occur in the composite correlation power. In contrast, with respect to the composite correlation power shown in FIG. 8, there are seven peaks, that is, peak values a, b, a, a+b+c, b, c, c, appearing; however, in this case, the greatest peak value (a+b+c) is detected as the reference code synchronization point. In this manner, in FIG. 8, all the peak values other than the peak value (a+b+c) are limited to a value corresponding to one peak of the correlation power; thus, as compared with the case of FIG. 7, it is possible to detect the reference code synchronization point with higher precision.

In a code synchronization detection section 511, the reference code synchronization point at which the composite correlation power has the greatest peak within the spread code cycle $T_p$ is detected, and an acquisition pulse synchronizing to this timing is generated so as to carry out the initial code synchronization.

Moreover, in the DLL 316, as described in the first embodiment, based upon the orthogonal correlation signal and the in-phase correlation signal and the acquisition pulse, the code synchronization tracking is carried out so that the data clock synchronizing to the cycle of the spread code sequence and the sample clock used for a sampling clock in the quadrature detection section 313 are outputted.

In the delay correction sections 321-1 to 321-N, the respective delay correction times of $\{T_P-\tau_1 T_c, T_P-\tau_2 T_c, T_P-\tau_3 T_c, \ldots, T_P-\tau_N T_c\}$ are applied to the orthogonal correlation signal and the in-phase correlation signal so that the timing synchronization between the spread code sequence by which the respective channels are multiplied is established. Moreover, in the data demodulation section 322-1 to 322-N, parallel demodulation data is calculated from the in-phase correlation signal and the orthogonal correlation signal calculated in synchronized timing with the rising edge of the data clock for each channel.

Here, the multiplex RF signal is a signal obtained by multiplexing the parallel spectrum spreading signals after the spectrum spreading process by using the same spread code sequence; and with respect to the respective parallel spectrum spreading signals of N channels, since each channel has a delay time different from the other channels that have been multiplexed, the cross-correlation between the respective channels has a small value at the time of data demodulation; thus, the demodulation process for each channel is available. Here, the parallel demodulation data, mentioned here, is a signal that satisfies the conditions that "the data needs to have the parallel bit rate $R_p$ and needs to be a value "1" or "−1"".

In the P/S 317, based upon the parallel demodulation data of the parallel bit rate $R_p$ of the N channels, demodulation data of a bit rate $R_b$ (=$NR_P$) for one channel is generated. In the spectrum spreading communication system in the present invention, the demodulation data can be extracted from the multiplex RF signal through the above-mentioned processes.

In this manner, according to the second embodiment, the quadrature detection section 313 and the data demodulation sections 322-1 to 322-N use the high-precision sample clock and data clock outputted from the DLL 316. Therefore, as compared with the conventional offset multiplexing SS system, it is possible to further improve the data demodulation characteristic.

Moreover, the delay coefficient $\tau_i$ (i=1, 2, . . . , N) that always satisfies expression (18) is set so that the greatest value of the side lobes is regulated. Therefore, it is possible to generate the acquisition pulse, sample clock and data clock that are calculated based upon the composite correlation power with higher precision. Thus, it becomes possible to further improve the data demodulation characteristic.

A third embodiment will now be explained. In the third embodiment, the order of operations is exchanged between the initial acquisition section 315 and the square calculation sections 1, 2 as well as the delay correction sections 4-1 to 4-N that are used in the DLL 316 in the second embodiment so that the above-mentioned functions of the delay correction sections 4-1 to 4-N are carried out by delay correction sections 321-1 to 321-N. In this manner, the spectrum spreading communication system, that is, the offset multiplexing SS system, can be realized.

Figure 9:
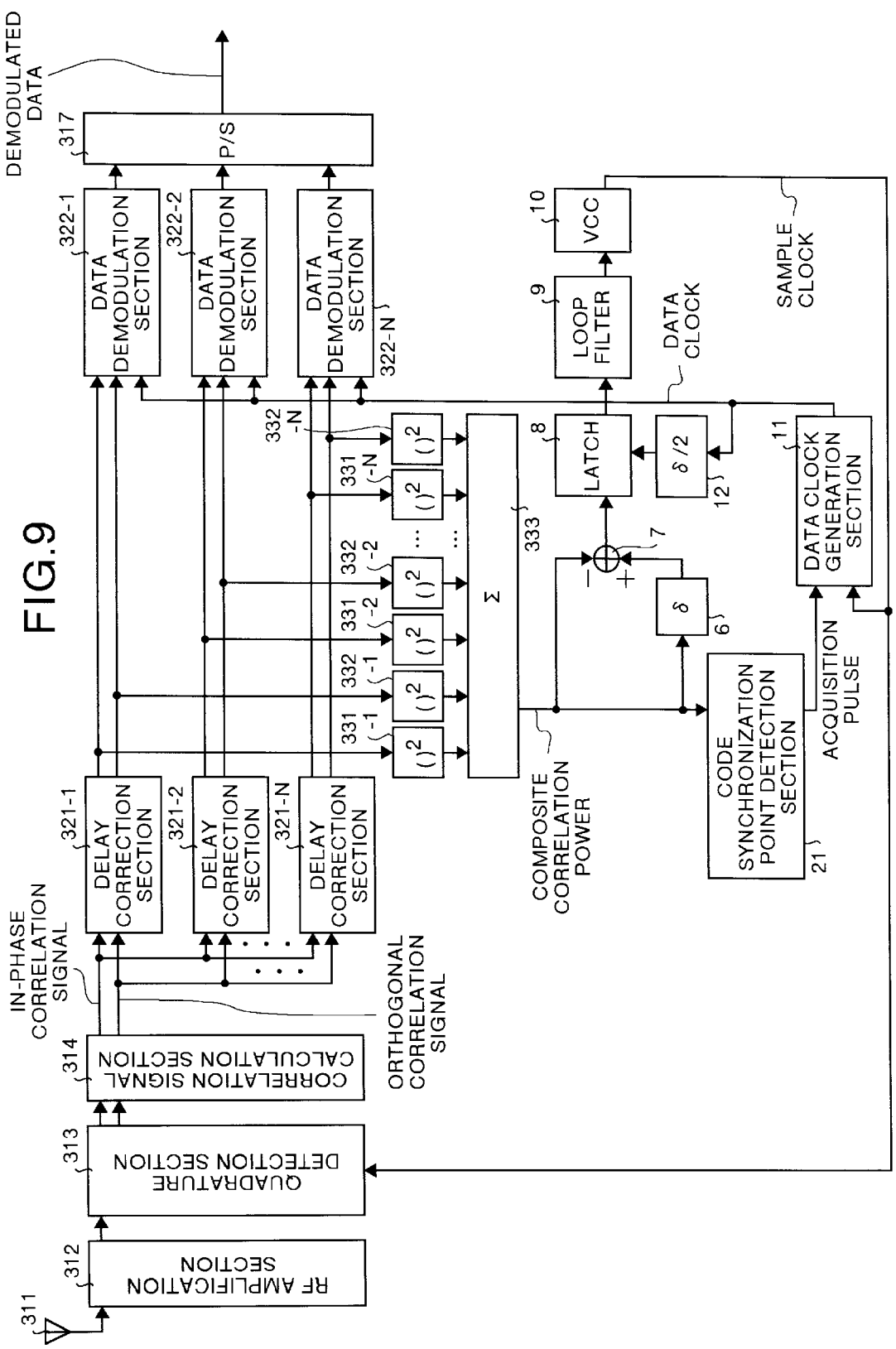
FIG. 9 is a block diagram that shows the construction of a receiver in accordance with a third embodiment in the spectrum spreading communication system in the present invention.

FIG. 9 is a drawing that shows the construction of a receiver in accordance with a third embodiment of the present invention. The transmitter has the same construction as that of the transmitter explained in connection with the second embodiment. Accordingly, explanation about the construction of the transmitter will be skipped. Moreover, in FIG. 9, same legends are provided to same or similar constitutional sections as those of the receiver according to the second embodiment and their explanation will also be omitted.

In FIG. 9, legends 331-1 to 331-N denote in-phase square calculation sections for squaring in-phase correlation signals that have been subjected to delay corrections in the delay correction sections 321-1 to 321-N, legends 332-1 to 332-N denote orthogonal square calculation sections for squaring orthogonal correlation signals that have been subjected to delay corrections in the delay correction sections 321-1 to 321-N, and legend 333 denotes an addition signal for adding all the signals outputted from the in-phase square calculation sections 331-1 to 331-N and the orthogonal square calculation sections 332-1 to 332-N.

Operation of a receiver in the offset multiplexing SS system according to the third embodiment will now be explained. In this receiver, the in-phase square calculation sections 331-1 to 331-N first output squared values of the in-phase correlation signals that have been subjected to delay corrections in the delay correction sections 321-1 to 321-N, and in the same manner, the orthogonal square calculation sections 332-1 to 332-N output squared values of the orthogonal correlation signals that have been subjected to delay corrections in the delay correction sections 321-1 to 321-N.

The adder 143 adds 2N number of the squared values outputted from the in-phase square calculation sections 331-1 to 331-N and the orthogonal square calculation sections 332-1 to 332-N, and outputs the result of addition as a composite correlation power value.

Next, an explanation will be given of the fact that the composite correlation power $SP_G'(t)$ (t: time) outputted from the adder 143 is equal to the composite correlation power $SP_G(t)$ outputted from the adder 5 of the DLL of the first and second embodiments.

In the same manner as the aforementioned embodiments, supposing that the in-phase correlation signal is SI (t), the orthogonal correlation signal is SQ(t) and the delay correc tion times that the delay correction sections 321-1 to 321-N apply to the SI(t) and SQ(t) are respectively $-\tau_i T_c (i=1, 2, \ldots, N)$, the composite correlation power $SP_G'(t)$ output from the adder 333 is represented by the following equation (19):

$$SP_G'(t) = \sum_{n=1}^{N} \{SI(t+\tau_n T_c)\}^2 + \sum_{n=1}^{N} \{SQ(t+\tau_n T_c)\}^2 \quad (19)$$

$$= \sum_{n=1}^{N} \left[ \{SI(t+\tau_n T_c)\}^2 + \sum_{n=1}^{N} \{SQ(t+\tau_n T_c)\}^2 \right]$$

$$= \sum_{n=1}^{N} \left\{ \sum_{l=1}^{N} \sum_{m=0}^{L-1} D_l(t-(\tau_l-\tau_n)T_c + mT_c) \right.$$

$$\left. c(t-(\tau_l-\tau_n)T_c + mT_c)c(mT_c) \right\}^2$$

Equation (19) shows that the composite correlation power $SP_G'(t)$ is equal to $SP_G(t)$ obtained from equation (14).

In this manner, in the third embodiment, the functions of the delay correction sections 4-1 to 4-N are carried out by using the delay correction sections 321-1 to 321-N which will be described later; and in this case also, the same effects as those of the second embodiment are obtained. In other words, the acquisition pulse, sample clock and data clock of the present embodiment also have the same characteristics as those of the second embodiment.

Moreover, the order of operations is exchanged between the initial acquisition section 315 of the second embodiment and the square calculation sections 1, 2 as well as the delay correction sections 4-1 to 4-N that are used in the DLL 316 so that the aforementioned functions of the delay correction sections 4-1 to 4-N are obtained by commonly using the delay correction sections 321-1 to 321-N; thus, it is possible to realize a superior data demodulation characteristic in the same manner as the second embodiment.

As described above, in accordance with the present invention, since the composite error signal is calculated by using the composite correlation power, the resulting composite error signal is allowed to have a higher S/N ratio as compared with the conventional error signal. For this reason, even in the case when an attempt is made to widen the loop filter band as compared with the conventional DLL loop filter, it is possible to make the S/N ratio of the composite error signal subjected to the filtering process higher than the conventional S/N ratio, and also to judge the advance/delay of the phase of the sample clock with higher precision; therefore, as compared with the conventional DLL, a superior tracking characteristic with high precision can be obtained. The resulting effect is that a delay lock loop which can generate a sample clock and a data clock with higher precision is obtained.

Further, the delay coefficient $\tau_i$ is set so as to always satisfy "$|(\tau_x-\tau_y)T_c| \geq (\delta/2)+(3T_c/2)$". Therefore, it is possible to reduce degradation in the composite error signal characteristic caused by side lobes of the composite correlation power, and consequently to realize a superior synchronization tracking characteristic with higher precision.

Further, the high-precision sample clock and data clock, outputted from the sample clock generation unit, are used in the quadrature detection unit and the respective data demodulation unit. Therefore, it is possible to achieve a receiver which has a better data demodulation characteristic than the conventional receiver.

In accordance with the next invention, it becomes possible to provide a receiver that can achieve a superior data demodulation characteristic with a smaller circuit scale.

In accordance with the next invention, the delay coefficient $\tau_i$ that always satisfies "$\tau_a-\tau_b \neq \tau_a'-\tau_b'$" is set so that the greatest value of the side lobes is regulated; therefore, it is possible to generate the acquisition pulse, sample clock and data clock that are calculated based upon the composite correlation power with higher precision. Thus, it becomes possible to further improve the data demodulation characteristic.

In accordance with the next invention, since the delay coefficient $\tau_i$ is set so as to always satisfy "$|(\tau_x-\tau_y)T_c| \geq (\delta/2)+(3T_c/2)$", it is possible to reduce degradation in the composite error signal characteristic caused by side lobes of the composite correlation power, and consequently to realize a superior synchronization tracking characteristic with higher precision.

In accordance with the next invention, the high-precision sample clock and data clock, outputted from the sample clock generation unit, are used in the quadrature detection unit and the respective data demodulation unit; therefore, it is possible to achieve a receiver which has better data demodulation characteristics than the conventional receiver.

In accordance with the next invention, it becomes possible to provide a receiver that can achieve a superior data demodulation characteristic with a smaller circuit scale.

In accordance with the next invention, the delay coefficient $\tau_i$ that always satisfies "$\tau_a-\tau_b \neq \tau_a'-\tau_b'$" is set so that the greatest value of the side lobes is regulated; therefore, it is possible to generate the acquisition pulse, sample clock and data clock that are calculated based upon the composite correlation power with higher precision. Thus, it becomes possible to further improve the data demodulation characteristic.

In accordance with the next invention, since the delay coefficient $\tau_i$ is set so as to always satisfy "$|(\tau_x-\tau_y)T_c| \geq (\delta/2)+(3T_c/2)$", it is possible to reduce degradation in the composite error signal characteristic caused by side lobes of the composite correlation power, and consequently to realize a superior synchronization tracking characteristic with higher precision.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A delay lock loop, which generates a sample clock and a data clock by tracking a code synchronization between a transmission side and receiving side based upon an in-phase correlation signal between an in-phase component of a complex spectrum spreading signal and a spread code sequence and an orthogonal correlation signal between an orthogonal component of the complex spectrum spreading signal and the spread code sequence, said delay lock loop comprising:

a correlation power generation unit which squares the in-phase correlation signal and the orthogonal correlation signal respectively, and adds the in-phase correlation signal and the orthogonal correlation signal that have been squared so as to generate a correlation electric power;

a delay correction unit which divides the correlation electric power into N (integer not less than 2) number of portions, and gives the respective portions first delay times different from each other so as to allow the respective electric power portions to have coincided peak timing;

a composite correlation power generation unit which adds the respective electric power portions so as to generate a composite correlation power;

a composite error signal generation unit which gives a second delay time to the composite correlation power, and generates a composite error signal indicating an advance/delay of the timing phase of the sampling clock by subtracting the composite correlation power that has been added from the composite correlation power that has been delayed;

a data clock generation unit which frequency-divides the sample clock based upon an acquisition pulse that is synchronous to the spread code sequence to generate a data clock; and a sample clock generation unit which gives a third delay time to the data clock, eliminates a noise component from the composite error signal that has been latched in synchronized timing with the data clock that has been delayed, and generates a sample clock based upon the composite error signal that has been noise-eliminated.

2. The delay lock loop according to claim 1, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$|(\tau_x - \tau_y)T_c| \geq (\delta/2) + (3T_c/2)$$

with respect to arbitrary x and y, where $x \in \{1, 2, \ldots, N\}$ and $y \in \{1, 2, \ldots, N\}$ and $x \neq y$.

3. A receiver, which is used in a spectrum spreading communication system so as to carry out parallel communications using a plurality of channels with a device on a transmitting side, said receiver comprising:

a quadrature detecting unit which generates an in-phase component and an orthogonal component of a complex spectrum spreading signal based upon a received multiplex RF signal;

a correlation signal calculation unit which calculates an in-phase correlation signal between the in-phase component of the complex spectrum spreading signal and a spread code sequence as well as an orthogonal correlation signal between the orthogonal component and the spread code sequence;

an acquisition pulse generation unit which generates an acquisition pulse that is synchronous to the cycle of the spread code sequence by which the complex spectrum spreading signal is multiplied, based upon the in-phase correlation signal and the orthogonal correlation signal;

a correlation power generation unit which squares the in-phase correlation signal and the orthogonal correlation signal respectively, and adds the in-phase correlation signal and the orthogonal correlation signal that have been squared so as to generate a correlation electric power;

a first delay correction unit which divides the correlation electric power into N (integer not less than 2) number of portions, and gives the respective portions first delay times different from each other so as to allow the respective electric power portions to have coincided peak timing;

a composite correlation power generation unit which adds the respective electric power portions so as to generate a composite correlation power;

a composite error signal generation unit which gives a second delay time to the composite correlation power, and generates a composite error signal indicating an advance/delay of the timing phase of the sampling clock by subtracting the composite correlation power that has been added from the composite correlation power that has been delayed;

a data clock generation unit which frequency-divides the sample clock based upon the acquisition pulse to generate a data clock;

a sample clock generation unit which gives a third delay time to the data clock, eliminates a noise component from the composite error signal that has been latched in synchronized timing with the data clock that has been delayed and generates a sample clock based upon the composite error signal that has been noise-eliminated;

a second delay-correction unit which divides the in-phase correlation signal and the orthogonal correlation signal respectively into N portions, and gives fourth delay times that are respectively different from each other thereto so that correlation peaks of the respective signals are generated in predetermined synchronized timing with the data clock; and a data demodulation unit for demodulating the original data sequence based upon the respective signals having been subjected to the delay correction.

4. The receiver according to claim 3, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$\tau_a - \tau_b \neq \tau_a' - \tau_b'$$

with respect to arbitrary a, a', b, and b', where $a \in \{1, 2, \ldots, N\}$, $a' \in \{1, 2, \ldots, N\}$, $b \in \{1, 2, \ldots, N\}$ and $b' \in \{1, 2, \ldots, N\}$ and $a' \neq a$ and $a' \neq b'$.

5. The receiver according to claim 3, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$|(\tau_x - \tau_y)T_c| \geq (\delta/2) + (3T_c/2)$$

with respect to arbitrary x and y, where $x \in \{1, 2, \ldots, N\}$ and $y \in \{1, 2, \ldots, N\}$ and $x \neq y$.

6. A receiver, which is used in a spectrum spreading communication system so as to carry out parallel communications using a plurality of channels with a device on a transmitting side, said receiver comprising:

a quadrature detecting unit which generates an in-phase component and an orthogonal component of a complex spectrum spreading signal based upon a received multiplex RF signal;

a correlation signal calculation unit which calculates an in-phase correlation signal between the in-phase component of the complex spectrum spreading signal and a spread code sequence as well as an orthogonal correlation signal between the orthogonal component and the spread code sequence;

a delay-correction unit which divides the in-phase correlation signal and the orthogonal correlation signal respectively into N portions, and gives first delay times that are respectively different from each other thereto so that correlation peaks of the respective signals are generated in predetermined synchronized timing with the data clock;

a composite correlation power generation unit which respectively squares the respective in-phase correlation signals that have been subjected the delay correction as well as squaring the respective orthogonal correlation signals that have been subjected to the delay correction, and then adds all the squared values to generate a composite correlation power;

an acquisition pulse generation unit which generates an acquisition pulse that is synchronous to the cycle of the spread code sequence based upon the composite correlation power;

a composite error signal generation unit which gives a second delay time to the composite correlation power, and generates a composite error signal indicating an advance/delay of the timing phase of the sampling clock by subtracting the composite correlation power that has been added from the composite correlation power that has been delayed;

a data clock generation unit which frequency-divides the sample clock based upon the acquisition pulse to generate a data clock;

a sample clock generation unit which gives a third delay time to the data clock, eliminates a noise component from the composite error signal that has been latched in synchronized timing with the data clock that has been delayed, and then generates a sample clock based upon the composite error signal that has been noise-eliminated; and a data demodulation unit which demodulates the original data sequence based upon the N number of in-phase correlation signals and the N number of orthogonal correlation signals that have been subjected to the delay correction.

7. The receiver according to claim 6, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$\tau_a - \tau_b \neq \tau_a' - \tau_b'$$

with respect to arbitrary a, a', b, and b', where $a \in \{1, 2, \ldots, N\}$, $a' \in \{1, 2, \ldots, N\}$, $b \in \{1, 2, \ldots, N\}$ and $b' \in \{1, 2, \ldots, N\}$ and $a' \neq a$ and $a' \neq b'$.

8. The receiver according to claim 6, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$|(\tau_x - \tau_y)T_c| \geq (\delta/2) + (3T_c/2)$$

with respect to arbitrary x and y, where $x \in \{1, 2, \ldots, N\}$ and $y \in \{1, 2, \ldots, N\}$ and $x \neq y$.

9. A spectrum spreading communication system, which carries out parallel communications using a plurality of channels between a transmitter and a receiver, said transmitter having, a spreading modulation unit which generates N (integer not less than 2) number of parallel spectrum spreading signals by multiplying N number of parallel data sequences generated from an inputted series data sequence by a spread code sequence respectively;

a multiplexing unit which gives first delay times different from each other to the respective parallel spectrum spreading signals, and adds all the parallel spectrum spreading signals subjected to the delay processes to generate a multiplex spectrum spreading signal; and a multiplex RF signal generation unit which generates a multiplex RF signal by converting the multiplex spectrum spreading signal to a radio frequency signal, and said receiver having, a quadrature detecting unit which generates an in-phase component and an orthogonal component of a complex spectrum spreading signal based upon a received multiplex RF signal;

a correlation signal calculation unit which calculates an in-phase correlation signal between the in-phase component of the complex spectrum spreading signal and a spread code sequence as well as an orthogonal correlation signal between the orthogonal component and the spread code sequence;

an acquisition pulse generation unit which generates an acquisition pulse that is synchronous to the cycle of the spread code sequence by which the complex spectrum spreading signal is multiplied, based upon the in-phase correlation signal and the orthogonal correlation signal;

a correlation power generation unit which squares the in-phase correlation signal and the orthogonal correlation signal respectively, and adds the in-phase correlation signal and the orthogonal correlation signal that have been squared so as to generate a correlation electric power;

a first delay correction unit which divides the correlation electric power into N number of portions, and gives the respective portions second delay times different from each other so as to allow the respective electric power portions to have coincided peak timing;

a composite correlation power generation unit which adds the respective electric power portions so as to generate a composite correlation power;

a composite error signal generation unit which gives a third delay time to the composite correlation power, and generates a composite error signal indicating an advance/delay of the timing phase of the sampling clock by subtracting the composite correlation power that has been added from the composite correlation power that has been delayed;

a data clock generation unit which frequency-divides the sample clock based upon the acquisition pulse to generate a data clock; and a sample clock generation unit which gives a fourth delay time to the data clock, eliminates a noise component from the composite error signal that has been latched in synchronized timing with the data clock that has been delayed and generates a sample clock based upon the composite error signal that has been noise-eliminated;

a second delay-correction unit which divides the in-phase correlation signal and the orthogonal correlation signal respectively into N portions, and gives fifth delay times that are respectively different from each other thereto so that correlation peaks of the respective signals are generated in predetermined synchronized timing with the data clock; and a data demodulation unit which demodulates the original data sequence based upon the respective signals having been subjected to the delay correction.

10. The spectrum spreading communication system according to claim 9, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$\tau_a - \tau_b \neq \tau_a' - \tau_b'$$

with respect to arbitrary a, a', b, and b', where $a \in \{1, 2, \ldots, N\}$, $a' \in \{1, 2, \ldots, N\}$, $b \in \{1, 2, \ldots, N\}$, $b' \in \{1, 2, \ldots, N\}$, $a' \neq a$, and $a' \neq b'$.

11. The spectrum spreading communication system according to claim 9, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$|(\tau_x - \tau_y) T_c| \geq (\delta/2) + (3 T_c/2)$$

with respect to arbitrary x and y, where $x \in \{1, 2, \ldots, N\}$, and $y \in \{1, 2, \ldots, N\}$ and $x \neq y$.

12. A spectrum spreading communication system, which carries out parallel communications using a plurality of channels between a transmitter and a receiver, said transmitter having, a spreading modulation unit which generates N number of parallel spectrum spreading signals by multiplying N number of parallel data sequences generated from an inputted series data sequence by a spread code sequence respectively;

a multiplexing unit which gives first delay times different from each other to the respective parallel spectrum spreading signals, and adds all the parallel spectrum spreading signals subjected to the delay processes to generate a multiplex spectrum spreading signal; and a multiplex RF signal generation unit which generates a multiplex RF signal by converting the multiplex spectrum spreading signal to a radio frequency signal, and said receiver having, a quadrature detecting unit which generates an in-phase component and an orthogonal component of a complex spectrum spreading signal based upon a received multiplex RF signal;

a correlation signal calculation unit which calculates an in-phase correlation signal between the in-phase component of the complex spectrum spreading signal and a spread code sequence as well as an orthogonal correlation signal between the orthogonal component and the spread code sequence;

a delay-correction unit which divides the in-phase correlation signal and the orthogonal correlation signal respectively into N portions, and gives second delay times that are respectively different from each other thereto so that correlation peaks of the respective signals are generated in predetermined synchronized timing with the data clock;

a composite correlation power generation unit which respectively squares the respective in-phase correlation signals that have been subjected the delay correction as well as squaring the respective orthogonal correlation signals that have been subjected to the delay correction, and then adds all the squared values to generate a composite correlation power;

an acquisition pulse generation unit which generates an acquisition pulse that is synchronous to the cycle of the spread code sequence based upon the composite correlation power;

a composite error signal generation unit which gives a third delay time to the composite correlation power, and generates a composite error signal indicating an advance/delay of the timing phase of the sampling clock by subtracting the composite correlation power that has been added from the composite correlation power that has been delayed;

a data clock generation unit which frequency-divides the sample clock based upon the acquisition pulse to generate a data clock; and a sample clock generation unit which gives a fourth delay time to the data clock, eliminates a noise component from the composite error signal that has been latched in synchronized timing with the data clock that has been delayed, and then generates a sample clock based upon the composite error signal that has been noise-eliminated; and a data demodulation unit demodulates the original data sequence based upon the N number of in-phase correlation signals and the N number of orthogonal correlation signals that have been subjected to the delay correction.

13. The spectrum spreading communication system according to claim 12, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $T_c$ represents chip cycle) is set so as to always satisfy the equation $$\tau_a - \tau_b \neq \tau_{a'} - \tau_{b'}$$

with respect to arbitrary a, a', b, and b', where $a \in \{1, 2, \ldots, N\}$, $a' \in \{1, 2, \ldots, N\}$, $b \in \{1, 2, \ldots, N\}$, $b' \in \{1, 2, \ldots, N\}$, $a' \neq a$, and $a' \neq b'$.

14. The spectrum spreading communication system according to claim 12, wherein delay coefficients $\{\tau_1, \tau_2, \tau_3, \ldots, \tau_N\}$ for determining the first delay times $\{\tau_1 T_c, \tau_2 T_c, \tau_3 T_c, \ldots, \tau_N T_c\}$ (where $t_c$ represents chip cycle) is set so as to always satisfy the equation $$|(\tau_x - \tau_y) T_c| \geq (\delta/2) + (3 T_c/2)$$

with respect to arbitrary x and y, where $x \in \{1, 2, \ldots, N\}$, and $y \in \{1, 2, \ldots, N\}$ and $x \neq y$.

* * * * *